Aug. 13, 1940.   R. H. SCOTT ET AL   2,211,169
TYPOGRAPHICAL COMPOSING MACHINE
Filed Jan. 13, 1940
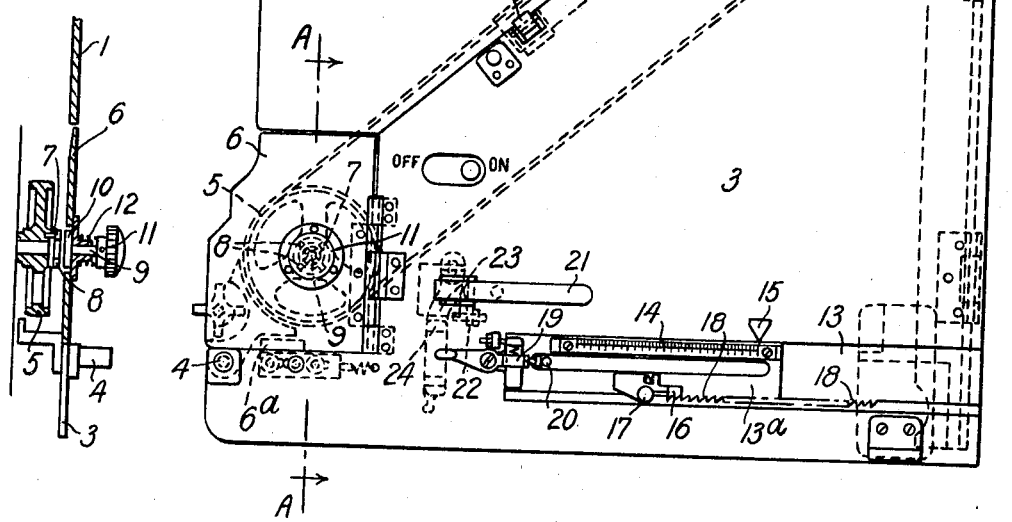
INVENTORS Patented Aug. 13, 1940

2,211,169

UNITED STATES PATENT OFFICE 2,211,169

TYPOGRAPHICAL COMPOSING MACHINE

Richard Henry Scott, Enfield, and William Fairall Gorse and Arthur Staniland Hayward, Altrincham, England, assignors to Linotype and Machinery Limited, London, England, a limited-liability company of Great Britain Application January 13, 1940, Serial No. 313,698
In Great Britain February 1, 1939

15 Claims. (Cl. 199—27)

This invention relates to typographical composing machines such as those known commercially under the registered trade-mark "Linotype," in which matrices, when released from a magazine, pass through assembler entrances and through chutes on to an inclined travelling belt known as the assembler belt, which, with the aid of a rotating star wheel, urges the matrices against a finger on a so-called assembler slide in which the matrices are composed in line.

The assembler slide, in composing the matrix line, is moved to the left as the line grows, in opposition to a spring or weight, while a brake prevents the assembler slide from returning, although it allows the slide to move in the direction in which the line progresses.

The before-mentioned inclined assembler belt passes over two pulleys, the lower one of which is mounted on a shaft located near the assembler slide, which shaft drives through suitable gearing a shaft on which the rotating star wheel is mounted.

During composition of a matrix line there are a number of minor adjustments which the operator may desire to make to the assembling mechanism. For example, a matrix may tend to jam on the star wheel, in which case it is customary for the operator to take hold of the assembler belt pulley and impart a slight easing motion thereto. Further, there is usually provided on the assembler slide an adjustable stop which strikes against a lever pivoted to the machine frame when the matrix line has reached the desired length. This lever can be lifted out of the way of the stop in order to release the line when too many matrices are contained therein and is, therefore, called the tight line release lever. The adjustable stop co-operates with a scale on the assembler slide so that setting of the stop in a desired position ensures that a line of matrices of corresponding length is composed.

As the line of matrices progresses in length the assembler slide carries it into a so-called assembler elevator which when the line is complete is raised to send the line to the casting mechanism. During such raising of the assembler elevator the brake which normally prevents the assembler slide from returning is automatically released by means of trip lever mechanism so as to allow the assembler slide to return by spring action to its original position. To enable the assembler slide to be manually released when desired, the brake operating thereon is connected to a pivoted lever carrying a slight projection which can be grasped by the operator to release the brake.

To enable the above-mentioned adjustments to be effected by the operator it is customary either to leave the above-mentioned working parts of the assembling apparatus, including part of the assembler belt and pulleys, exposed to view, or to provide hinged or sliding cover plates for the assembling apparatus, which cover plates have to be moved when the operator desires to effect any adjustments to the assembling mechanism.

The object of the present invention is to provide one or more easily removable cover plates for the assembling apparatus, which cover plates allow minor adjustments to be made to the assembling apparatus without the necessity for removing such cover plates.

According to the invention the assembling apparatus of a typographical composing machine is wholly or partially enclosed by means of one or more easily removable cover plates carrying mechanism for effecting adjustment of said assembling apparatus. The said mechanism may comprise means for easing the assembler belt pulley alternatively or in addition to a control adjustment for the matrix line length on the assembler slide. If desired release mechanism for the assembler slide brake may also be included. Preferably, the assembler cover consists of an upper plate and a lower plate dividing the same substantially diagonally at about the upper line of the assembler belt and in this construction the adjustments are carried by the lower plate.

The invention will now be described in greater detail with reference to the accompanying drawing which illustrates one form which it may assume and in which:

Figure 1 is a side view of the assembler mechanism and cover plates of a typographical composing machine according to the invention, and Figure 2 is a cross section of Figure 1 on the line A—A.

Referring to the drawing, the upper part of the assembling apparatus is covered by a plate 1 hinged at the top and held in position by means of a catch 2. The lower part of the assembling apparatus is covered by a plate 3 which is hinged at one side, and held in position at the other side by a screw or catch 4. Part of this lower plate which covers the lower assembler belt pulley 5 is provided with a hinged door 6 held in position by means of a spring catch 6a which is readily accessible to the operator. The boss 7 of the lower assembler belt pulley 5 has formed therein one or more grooves 8 and the hinged door has mounted therein a short shaft 9 which is formed at one end with a key piece 10 for engaging with the grooves 8 in the pulley boss 7, and at the other end on the outside of the cover the shaft is formed with a knob 11 which the operator can push inwardly against the action of a spring 12 so as to engage the key piece 10 with the grooves 8 in the pulley boss 7 for the purpose of effecting a controllable easing motion thereof.

In order to provide a control adjustment for the length of the matrix line on the assembler slide the part of the lower plate 3 which would normally cover the scale on the assembler slide has formed therein a slot 13 carrying a longitudinally adjustable frame 13a. The frame carries a scale 14 co-operating with a fixed indicating mark 15 on the cover plate 3, and the frame also carries a spring-pressed pawl 16 which has a finger grip 17 and engages with a rack 18 formed on the lower surface of the slot 13.

The tight line release lever 19 is mounted at the left end of the frame 13a, and a fixed projection or stop 20 on the assembler slide extends through the frame 13a. In operation the operator grasps the finger grip 17 on the spring-pressed pawl 16 and moves the frame 13a to a position in which the number on the scale 14 corresponding to the length of line desired is brought opposite the fixed indicating mark 15 on the cover plate 3. The tight line release lever 19 is thus set in a position in which the fixed stop or projection 20 on the assembler slide will abut thereagainst when the desired length of line is reached.

For providing a release for the brake on the assembler slide the lower cover plate 3 also carries on the outside an arm 21 which is pressed outwardly by means of a spring. This arm is connected to a short shaft passing through the cover plate and formed with an extension 22 which, when the arm is pressed inwardly, engages with the lever 23 which is normally moved by hand to release the brake 24 on the assembler slide aforesaid.

Having described our invention, we declare that what we claim and desire to secure by Letters Patent is:

1. In a typographical composing machine of the kind referred to assembling mechanism, a readily removable cover plate therefor and means carried by said plate for effecting adjustment of said assembling apparatus.

2. In a typographical composing machine of the kind referred to assembling mechanism, a readily removable cover plate therefor and adjusting mechanism carried by said plate for easing the assembler belt pulley.

3. In a typographical composing machine of the kind referred to assembling mechanism including an assembler slide, a readily removable cover plate therefor, said plate carrying mechanism for controlling the adjustment for the length of the matrix line on said assembler slide.

4. In a typographical composing machine of the kind referred to assembling mechanism including an assembler slide and a brake for said slide, a readily removable cover plate therefor, said plate carrying release mechanism for said assembler slide brake.

5. In a typographical composing machine of the kind referred to assembling mechanism, a cover plate for said mechanism, said plate carrying mechanism for easing the assembler belt pulley, for controlling the length of the matrix line on the assembler slide and for releasing the assembler slide brake.

6. In a typographical composing machine of the kind referred to assembling mechanism including a belt and pulleys, a cover plate enclosing one of said pulleys, a releasable member carried by said cover plate and adapted to engage the boss of said pulley and effect adjustment thereof.

7. In a typographical composing machine of the kind referred to assembling mechanism including an assembler slide, a cover plate therefor having a longitudinal slot, a frame adjustable in said slot, a tight line release lever on said frame and a stop on said assembler slide engaging said lever when the desired matrix line length has been reached.

8. In a typographical composing machine according to claim 7 the provision of a pawl and ratchet for longitudinal adjustment of said frame and a scale thereon adapted to co-operate with an indicating mark on said cover plate.

9. In a typographical composing machine of the kind referred to assembling mechanism including an assembler slide and a hand release brake therefor, a readily removable cover plate and an arm on said cover plate adapted to operate the hand release lever of said brake.

10. In a typographical composing machine of the kind referred to assembling mechanism, an upper cover plate and a lower cover plate for said mechanism, said plates being readily removable and adjoining one another substantially diagonally and substantially along the upper line of the assembler belt, said lower plate carrying mechanism for easing the assembler belt pulley, for controlling the length of the matrix line on the assembler slide and for releasing the assembler slide brake.

11. In a typographical composing machine of the kind referred to assembling mechanism, a readily removable upper cover plate and a readily removable lower cover plate for said mechanism, an assembler belt pulley, said lower plate having a hinged portion enclosing said pulley and carrying a releasable spring loaded shaft having a key adapted to engage a groove on the boss of said pulley.

12. In a typographical composing machine of the kind referred to assembling mechanism, a readily removable upper cover plate and a readily removable lower cover plate for said mechanism, an assembler belt pulley, said lower plate having a hinged portion enclosing said pulley and carrying a releasable spring loaded shaft having a key adapted to engage a groove on the boss of said pulley, said lower plate also carrying mechanism for controlling the length of the line on the assembler slide.

13. In a typographical composing machine of the kind referred to assembling mechanism, a readily removable upper cover plate and a readily removable lower cover plate for said mechanism, an assembler belt pulley, said lower plate having a hinged portion enclosing said pulley and carrying a releasable spring loaded shaft having a key adapted to engage a groove on the boss of said pulley, said lower plate also carrying release mechanism for the assembler slide brake.

14. In a typographical composing machine of the kind referred to assembling mechanism, a readily removable upper cover plate and a readily removable lower cover plate for said mechanism, an assembler belt pulley, said lower plate having a hinged portion enclosing said pulley and carrying a releasable spring loaded shaft having a key adapted to engage a groove on the boss of said pulley, said lower plate having a frame longitudinally adjustable in a slot therein and carrying the tight line release lever, said lever engaging a stop on the assembler slide at the desired matrix line length and release mechanism on said lower plate for the assembler slide brake.

15. In a typographical composing machine of the kind referred to assembling mechanism including a belt and pulleys, an assembler slide, a brake therefor, an upper cover plate and a lower cover plate for said mechanism, said plates being readily removable, said lower plate having a hinged portion enclosing one of said belt pulleys and carrying a releasable spring loaded shaft having a key therein adapted to engage a groove on the boss of said pulley, a slot in said lower plate, a frame longitudinally adjustable in said slot, a tight line release lever on said frame and a stop on said assembler slide engaging said lever when the desired matrix line length has been reached and an arm on said lower plate adapted to operate the hand release lever of said assembler slide brake.

RICHARD HENRY SCOTT.
WILLIAM FAIRALL GORSE.
ARTHUR STANILAND HAYWARD.